United States Patent Office 3,462,215
Patented Aug. 19, 1969

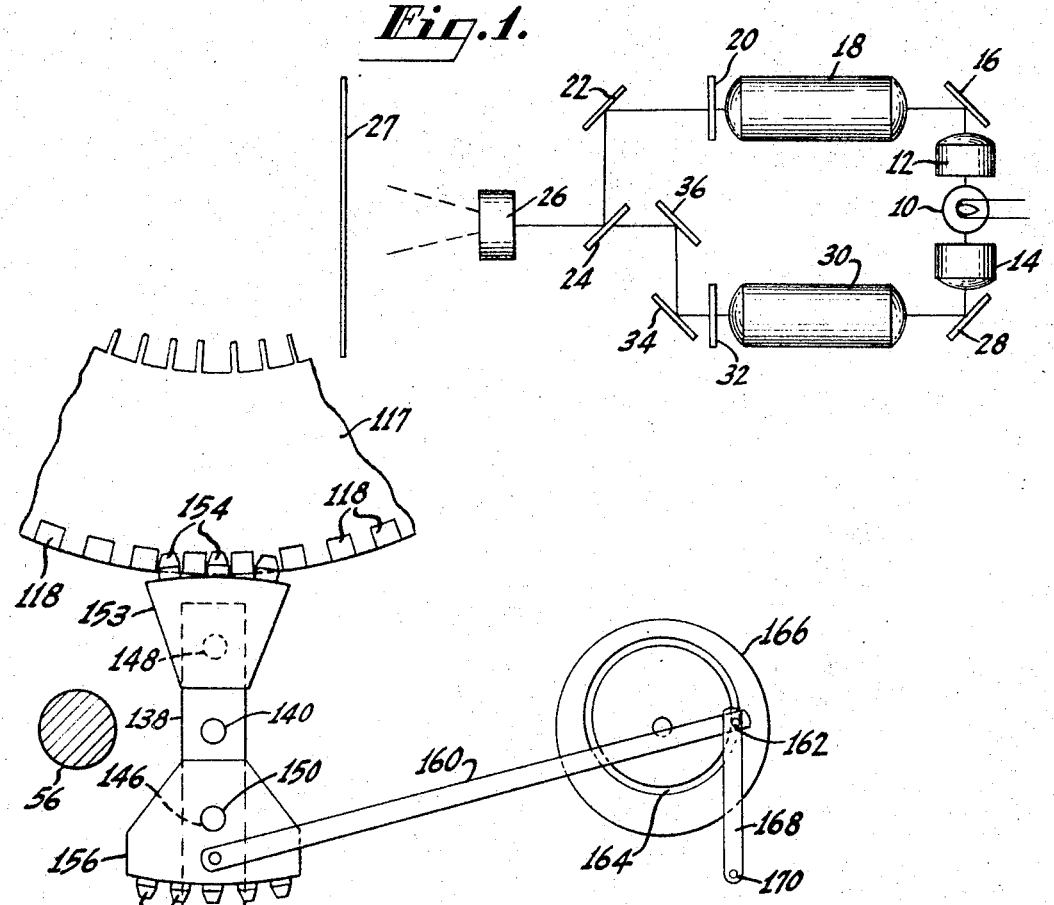

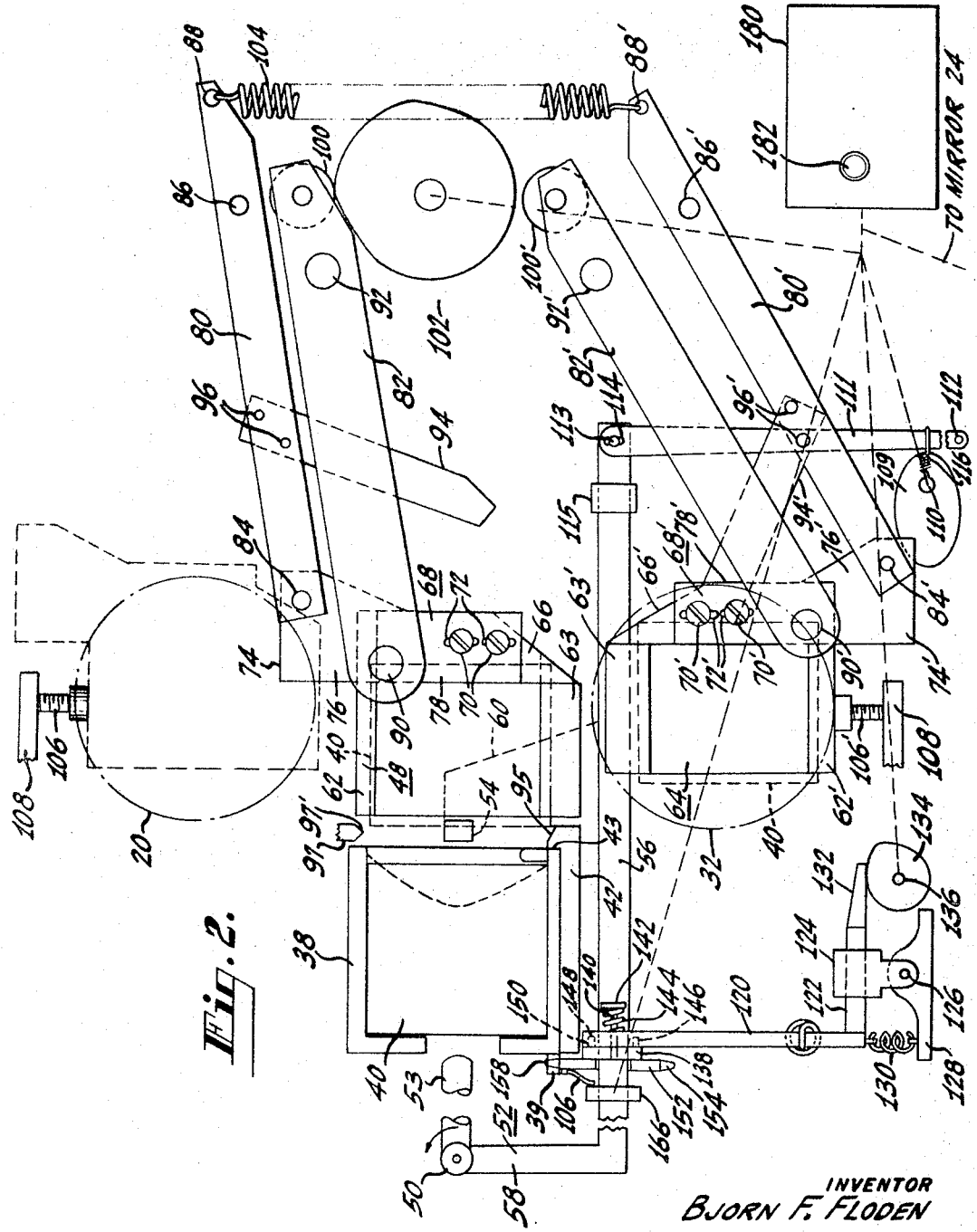

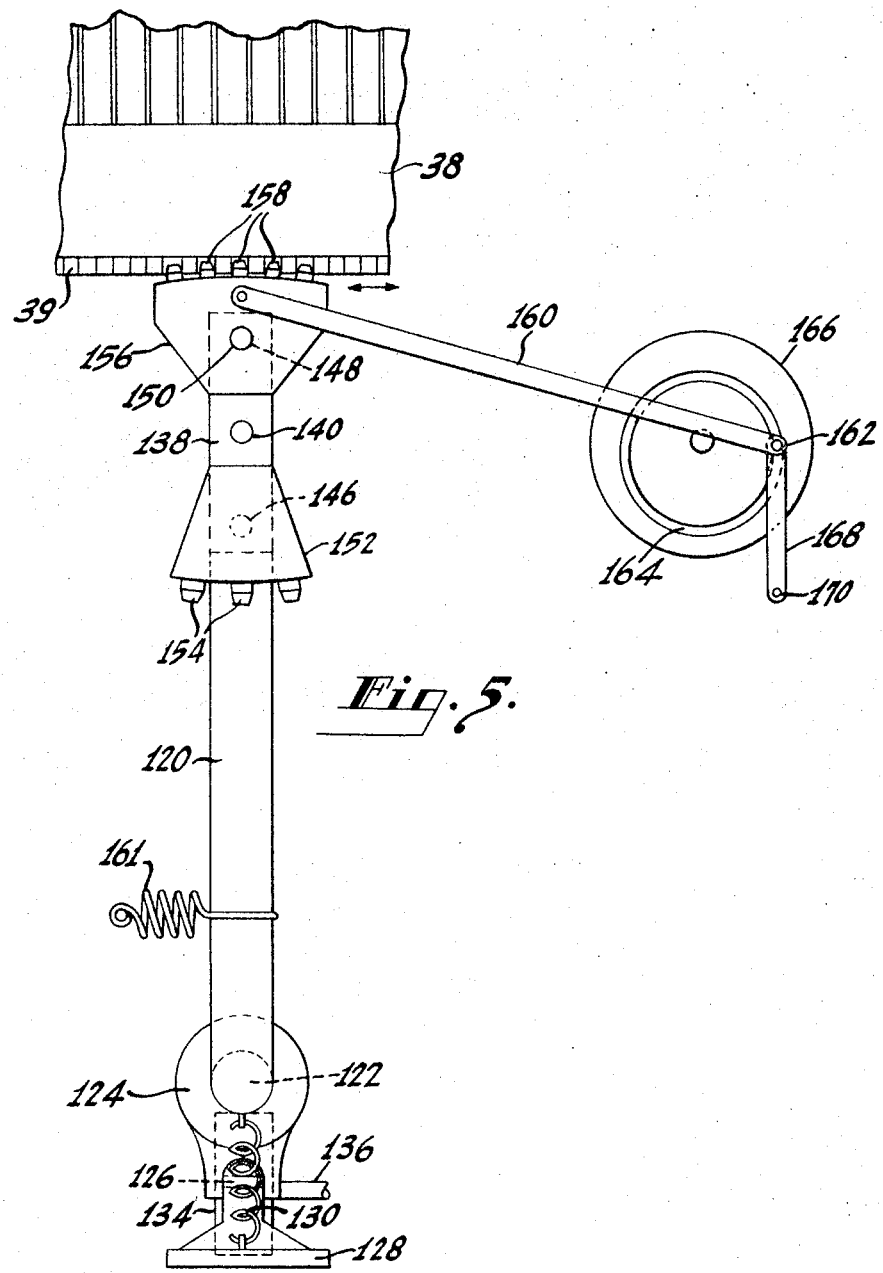

3,462,215
SLIDE PROJECTOR INCLUDING TWO LIGHT PATHS AND ONE SLIDE MAGAZINE
Bjorn F. Floden, Palmyra, N.J., assignor to RCA Corporation, a corporation of Delaware
Filed Aug. 25, 1967, Ser. No. 663,365
Int. Cl. G03b 21/24
U.S. Cl. 353—82          7 Claims

ABSTRACT OF THE DISCLOSURE

A slide projector having two light paths with one light path above the other. A slide gate is provided for each light path. Slides are taken out of the compartments of a single magazine, which may be either the drum or the straight type. The magazine is mounted at an elevation between the two light paths. Two slide holders are mounted for movement between two positions. The first position of the first slide holder is in the upper light path and the second position of the second slide holder is in a slide exchange position with respect to the slide magazine. The second position of the first slide holder is in a slide exchange position with the magazine and the first position of the second slide holder is in the lower light path. The slides are moved back and forth between the magazine and the slide holders when the slide holders are in the slide exchange position. The magazine moves two steps forward and one step backward alternately to present full compartments to the slide holders when the slide holders have no slides therein and to present empty compartments to the slide holders when the slide holders have slides therein.

Background of the invention

For speeding up the projection of slides, it has been suggested that successive slides be projected on the same screen either by the use of two projectors alternately or by the use of one projector having a plurality of light paths and a slide gate at each light path. When independent slide magazines are used to supply the slides for the two projectors or for the two light paths, adjacent compartments of each of the two magazines contain slides that are shown alternately. Difficulty is experienced in loading the slides into the magazines in the correct order. When one magazine is used to supply slides for both projectors or for both light paths, the practice has been to return the projected slides to the magazine in their original order manually after all the slides have been projected, resulting in extra effort and in delay and also in possible error in properly returning the slides to the magazine.

The sides of a slide magazine that is to be used with a mechanical slide projector must be open to permit access of a slide pusher into both sides of the slide compartments and also to permit a slide to be pushed into or out of a compartment. Therefore, the slide magazine should be oriented so that the slides will not fall out of their compartments, that is, the magazine should be oriented so that the top of the magazine is up. In known systems comprising two projectors aimed at one screen or one projector having two light paths, the light paths are positioned side-by-side. Since a slide magazine should not be turned on its side, use of such known dual projector systems with one slide magazine involves a complicated motion for the means that moves the slide from the magazine to a slide projecting position. Furthermore, it is advantageous to be able to use either a straight or a drum type slide magazine with the projector.

It is an object of this invention to provide in a slide projector improved apparatus for taking slides out of the compartments of one magazine, which may be either the straight or the drum type, projecting them alternately on the same screen, and putting the slides back into the same magazine and in the same compartments from which they were originally taken.

Summary of the invention

In accordance with the invention a slide projector having two light paths, or two slide projecting assemblies, is provided in which one of the light paths is above the other. A slide magazine is positioned in a manner so that the slides may move in and out from a side thereof, and to one side of both light paths and at an elevation which is between the elevation of the two light paths. Slide pusher means are provided to move slides out of the magazine and to move them to an intermediate position between the light paths and more nearly in line with the light paths than the position of the magazine. The slides are moved alternately from the intermediate position into the light paths and back to the intermediate position, from where they are moved back into the magazine. The slide magazine is moved two steps forward and one step back to present a full compartment to the slide pusher when it is moving a slide to the intermediate position and to present an empty compartment to the slide pusher when the pusher is moving a slide back into a compartment, whereby the slides are returned to the magazine in the same order or relative position in which they were originally placed therein. The slide magazine moving means is adapted to move either a straight or a drum type magazine.

Brief description of the drawings

The invention will be better understood upon reading the following description in connection with the following drawing in which FIGURE 1 is a schematic side elevational view of a projector with which the slide changing mechanism of the invention may be used, FIGURE 2 is an elevational view of a slide changing mechanism of this invention showing the relationship of the slide changing mechanism to the slide gates shown in FIGURE 1, FIGURE 3 is an elevational view at a larger scale of the magazine moving mechanism of FIGURE 2, FIGURE 4 is an edge elevational view of a slide holder shown in FIGURE 2, FIGURE 5 is an elevational view at a larger scale of the magazine moving mechanism of FIGURE 2 in a different adjustment thereof.

Description

Figure 6:
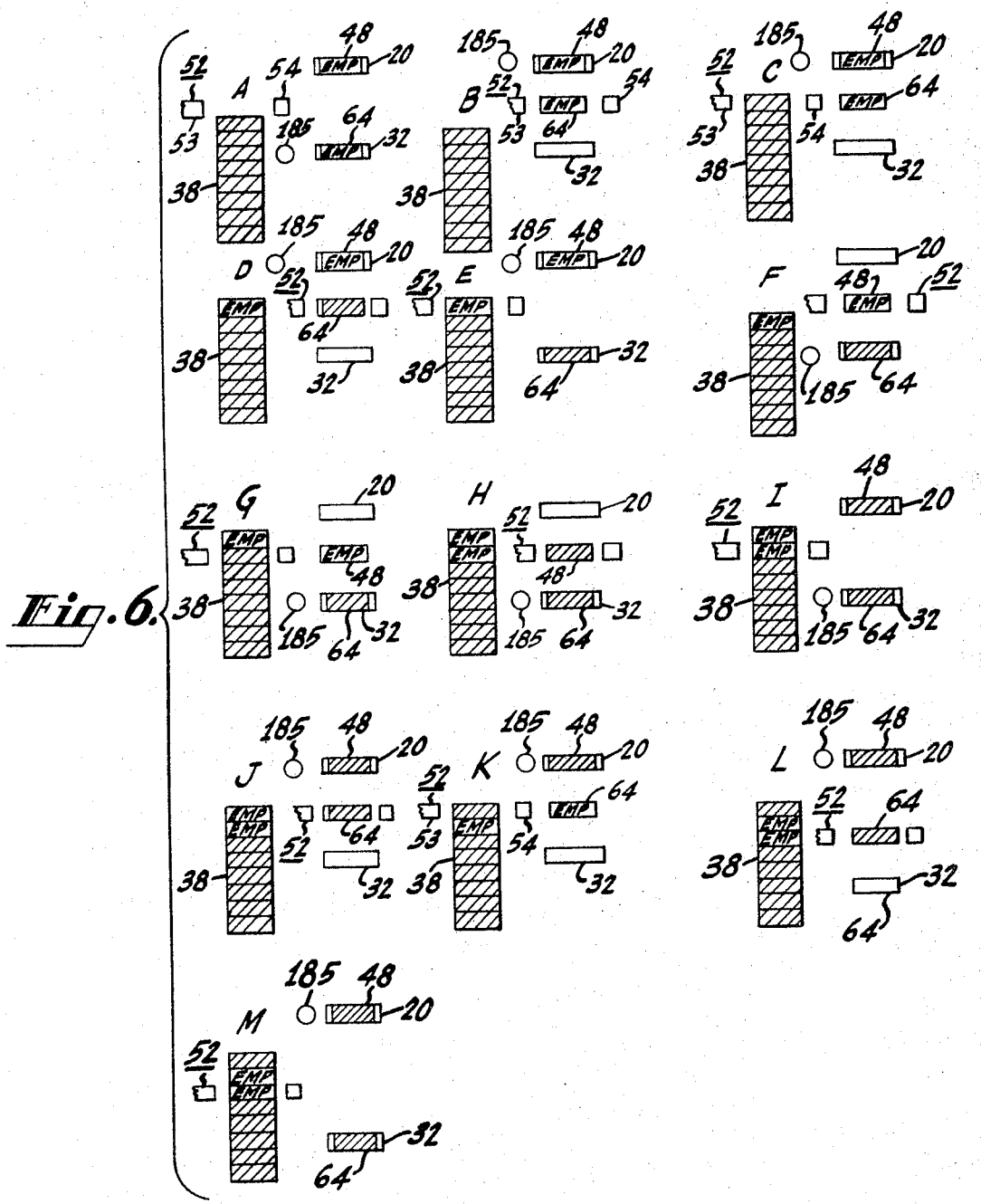
FIGURES 6A and 6M are diagrams useful in explaining the operation of the described slide changer.

As shown in FIGURE 1, a projection lamp 10 throws light into an upper condenser lens system 12 and a lower condenser lens system 14. The light from the lens system 12 strikes a mirror 16 which is positioned at a 45° angle with respect to the axis of the lens system 12. The light striking the mirror 16 is deflected 90° and goes through a focusing lens system 18. The light from the focusing lens 18 goes through an upper film gate 20 and is directed down in a direction parallel to the axis of the lens system 12 by another mirror 22. The light then hits another mirror 24, enters a projection lens 26 and is projected on a screen 27 in a known manner. The mirror 24 is movable in its own plane between a position where the light from the mirror 22 hits the mirror 24 and a second position where the light from the mirror 22 does not hit the mirror 24, for a purpose to be explained.

The light from the condenser lens 14 hits a mirror 28 and is directed into a path parallel to the axis of the lens system 18 and also in a direction towards the screen 27. The light from the mirror 28 passes through a lens system 30 and through a second or lower slide gate 32. After the light has passed through the slide gate 32, the light is reflected upwards by a mirror 34 into a path parallel to the axis of the lens system 14. The mirror 34 is so positioned that the path of the light reflected therefrom is closer to the light source 10 than the path of the light reflected from the mirror 22. A mirror 36 is positioned and arranged to reflect the light from the mirror 34 into line with the light from the mirror 24 and traveling in the same direction. Therefore, when the mirror 24 is in its position to reflect the light from the mirror 22 into the projecting lens 26, the mirror 24 blocks the light from the mirror 36. When the mirror 24 is in its alternate position where it is not in position to reflect the light from the mirror 22, the light from the mirror 36 shines into the projection lens 26. Therefore, a slide in the upper gate 20 or a slide in the lower gate 32 is projected on the screen 27, when the mirror 24 is in its light reflecting position and when it is in its non-reflecting position, respectively.

The film gate positions 20 and 32 indicated by drawn circles in FIGURE 2 correspond to the film gates 20 and 32 of FIGURE 1. A magazine 38 having slides 40 therein is positioned on a supporting table 42, which may be to the left of (as viewed in FIGURE 2) and substantially halfway between the film gates 20 and 32. This magazine 38 is of the type having parallel arranged compartments each having open sides and a closed top and bottom, so built that a silde 40 can be slipped into and out of the compartments of the magazine 38 from the right as viewed in FIGURE 2. Furthermore, a slide pusher 52 to be described can be moved into a compartment of the magazine 38 from the left as viewed in FIGURE 2. The magazine 38 also has teeth 39 along the lower left-hand edge thereof for moving the magazine 38 in a direction parallel to the length thereof. The table 42 has a shoulder 43 which acts as a guide for the lower right-hand edge of the magazine 38.

A slide holder 48 moves between extreme positions, the upper one of which, shown in dotted lines in FIGURE 2, is in the position hereinafter called a gate 20, where the slide that is held thereby will be projected. The lower position of the holder 48 is in line with the table 42 and in position to receive a slide 40 from the magazine 38, or conversely, to deliver a slide 40 that may be in the holder 48 into the magazine 38. A second slide holder 64 moves between an upper, slide exchange position with respect to the table 42 and a lower position at the film gate position 32.

The slide pusher 52 is provided to push the slides 40 back and forth between two positions. The slide pusher 52 comprises a lower bar 56, two spaced upstanding parallel legs 58 and 60 and upper aligned opposed pusher bars 53 and 54. The opposed ends of the pusher bars 53 and 54 are spaced sufficiently to clear the magazine 38, the spacing of the pusher bars 53 and 54 also being sufficient to clear the holders 48 and 64. The slide pusher 52 is moved between two extreme positions in one of which the bars 53 and 54 clear the magazine 38 and in the other of which they clear the holder 48 or 64. In its motion between its extreme positions, the pusher 52 pushes a slide 40 from a compartment of the magazine 38 into a holder 48 or 64, or conversely the pusher 52 pushes a slide 40 from a holder 48 or 64 into the magazine 38. The bar 53 may be hinged on the bar 58 as by the hinge 50, for a purpose to be explained.

The holder 48 (see FIGURES 2 and 4) comprises opposed parallel members 62 and 63 whose opposed edges are grooved to hold a slide 40 therebetween. The members 62 and 63 are held togeher by a further member 66 fixed to one side of the grooved members 62 and 63. As shown in FIGURE 2, the lower corner of the member 66 may be cut away. A plate 68 is adjustably fixed to one side of the member 66 as by cap screws 70 extends through slots 72 in the palte 68. The plate 68 may comprise an upper rectangular portion 74, an intermediate trapezoidal portion 76 and a lower rectangular portion 78, as shown in FIGURE 2.

A pair of parallel bars 80 and 82 are provided for moving the slide holder 48. The bar 80 is pivoted to the upper rectangular portion 74 of the plate 68 as by a pivot 84. The bar 80 is also pivoted on a fixed support (not shown) by means of a pivot 86. The bar 80 continues beyond the pivot 86 and a spring receiving hole 88 is provided in the end of the bar 80. The lower corner of the bar 80 near the hole 88 may be cut away for clearance purposes. A flat rod 94 is adjustably fixed as by fastening means 96 on the bar 80, the bar 80 being thick enough as at 98 (FIGURE 4) so that the rod 94 is in the same plane as a slide 40 that is in the holder 48. The purpose of the rod 94 is explained hereinbelow.

The bar 82 is pivoted as by a pivot 90 on the lower part of the trapezoidal portion 76 of the plate 68. The bar 82 is also pivoted on the fixed support (not shown) as by a pivot 92. Since the four pivots 84, 86, 90 and 92 are positioned to describe a parallelogram, the bars 80 and 82 remain parallel throughout their motion and the holder 48 to which the bars 80 and 82 are fastened always retains its vertical orientation as the bars 80 and 82 rotate about their pivots. A cam-following roller 100 is mounted for rotation at the end of the bar 82, beyond the pivot 92. The lower end of the bar 82 adjacent to the roller 100 is cut away for clearance purposes. A cam 102 is mounted for rotation on the fixed suport (not shown) in a manner so that its edge can contact the roller 100.

As will be noted, the slide pusher 52 can move by the holder 48 when it is in its slide receiving or delivery position and contains no slide. Also the slide pusher 52 can push a slide 40 from the magazine 38 into the holder 48 when the pusher 52 moves to the right as found in FIGURE 2, and the slide pusher 52 can move a slide 40 out of the holder 48 and into the magazine 38 when the slide pusher 52 moves in the opposite direction. The edge of the table 42 is cut away as shown at 95 and a pointed guide bar 97 is provided to help guide a slide 40 in its motion between the magazine 38 and the holder 48. Also the slanting portion 95 of the table and the right hand upwardly slanting portion 97' of the guide bar 97 act respectively to push a slide a little further into the holder 64 as it moves down or into the holder 48 as it moves up.

The parts of the holder 64 bearing prime numbers 62', 63', 66', 68', 70', 72', 74', 76', 78', 80', 82', 84', 86', 88', 90', 92', 94', 96' and 100' are the same in shape and operate in a similar manner to the corresponding unprimed parts of the holder 48. It is noted however, that the prime parts are each upside down with respect to the corresponding unprimed parts, and that the primed parts are in the same vertical plane as the corresponding unprimed parts, to provide a holder 64 which is upside down with respect to the holder 48. A tension spring 104, whose ends are received respectively in the holes 88 and 88' tends to hold the rollers 100 and 100' in contact with the cam 102. As will be explained, the holder 64 moves between a lower position in the gate position 32 and an upper position in the slide exchange position with respect to the magazine 38.

An adjustable stop 106 is positioned in a support 108 to stop motion of the holder 48 in an upward direction. Similarly, an adjustable stop 106' is positioned in the support 108 to stop motion of the holder 64 in a downward direction.

The motion of the pusher 52 is accomplished by a cam 109 which rotates about an axis 110 and bears on a lever 111. One end of the lever 111 is pivoted on a support (not shown) by a pin 112 and the other end of the lever 110 is pivotally fixed to the rod 56 by a pin 113. The pin 113 moves in a slot 114 and the rod 56 is supported in a guide 115 to permit straight line motion of the rod 56. A tension spring 116 holds the lever 111 against the cam 109, whereby, upon rotation of the cam 109, the pusher 52 moves from a magazine straddling position to a holder straddling position in accordance with the shape of the cam 109 to move slides between a holder 48 or 64 and the magazine 38. If the arm 53, which is pivoted on the rod 58, is rotated counterclockwise as viewed in FIGURE 2, the pusher 52 can continue to push slides from a holder 48 or 64 into the magazine 38 but can no longer move a slide from the magazine 38 into a holder 46 or 64. Therefore, by so rotating the arm 53, the holder 46 and 64 may be unloaded and not reloaded if such operation is desired.

As shown in FIGURES 2 and 5, a straight magazine 38 having teeth 39 along a margin thereof may be used in the described slide projector. However, since a magazine 117 (FIGURE 3) which is of the rotary or drum type, conveniently holds more slides than a straight magazine 38, it is advantageous to be able to use such a magazine 117 with the described slide projector. However, whichever magazine is used, the magazine must be moved the distance between three adjacent slide holding compartments of the magazine forward and the distance between two adjacent compartments backward, that is, two steps forward and one step backward, alternately, in feeding slides to the holders 48 and 64 and in returning the slides to the magazine 38 or 117. The lengths of the steps differ for the two magazines 38 and 117 and therefore it is necessary for the magazine moving means, to be described, to move the two magazines different distances forward and backwards. An adjustable magazine moving means is described in connection with FIGURES 2, 3 and 5. In FIGURES 2 and 5, the magazine mover is adjusted to move straight magazines such as the magazine 38, while in FIGURE 3 the magazine mover is adjusted to move rotary or drum magazines such as the magazine 117.

A lever 120 is provided having a cylindrical portion 122 extending laterally from the lower end thereof. The portion 122 is rotatably mounted in a bearing 124 which is itself mounted for rotation about an axis perpendicular to the axis of the portion 122 about a pin 126. The pin 126 extends through a support 128. A compression spring 130 is mounted between the lower end of the lever 120 and an upper surface of the support 128 to urge clockwise rotation of the lever 120 and of the portion 122. The end 132 of the portion 122 is shaped to ride on a cam 134 which rotates about its axis 136. The compression spring 130 causes the end portion 132 to ride on the cam 134. The lever 120, as viewed in FIGURE 2, rocks clockwise and counterclockwise in accordance with the shape of cam 134. The lever 120 also rocks clockwise and counterclockwise as viewed in FIGURE 5, about the portion 122, by means that will be described.

A plate 138 is mounted for rotation on one side of the lever 120 near the top thereof. A pin 140 having a head 142 extends into a hole in the lever 120 and is fixed to the plate 138. As shown in FIGURE 2, a compression spring 144 is positioned on the pin 140 between the head 142 and the lever 120. A pin 150 (see FIGURES 3 and 5) extends from the plate 138 towards the lever 120 and extends into one or the other of the holes 146 and 148 in the lever 120, depending on the rotary position of the plate 138 with respect to the lever 120. A sectoral plate 153 is provided having teeth 154 extending from the end thereof that mesh with teeth 118 (see FIGURE 3) extending from the side of the drum magazine 117 at the periphery thereof. Another sectoral plate 156 is provided having teeth 158 extending from the end thereof, the teeth 158 meshing with the teeth 39 on the straight magazine 38 as shown in FIGURE 5. The plates 152 and 156 are fixedly mounted on the plate 138 for rotation therewith, the teeth 154 and 158 extending in opposite directions.

One end of a flexible rod 160 is pivoted on the plate 156 and the other end of the rod is fixed to a pin 162 which extends into the groove 164 in a rotatable face cam 166. A lever 168 which is pivoted on the pin 162 and on the fixed support (not shown) as by a pin 170, holds the pin 162 in the groove 164. Therefore, either the teeth 154 or the teeth 158 can be brought to an uppermost position as viewed in FIGURES 2, 3 and 5 by pulling the plate 138 away from the lever 120, thereby compressing the spring 144, until the pin 150 is out of its hole 146 or 148, and by rotating the plate 138 one hundred eighty degrees and releasing the plate to permit the pin 150 to enter the other of the holes 146 and 148. Since the rod 160 is a long flexible rod, rotation of the plate 138 is possible in a direction to bend the rod 160. When the plate 138 is in the position shown in FIGURE 5 with the teeth 158 uppermost, the distance between the connection of the rod 160 to the lever 120 and the pivot-like rod portion 122 is greater than when the teeth 154 are in their uppermost position, see FIGURE 3, whereby rotation of the cam 166 rocks the lever 120 through a smaller angle in the position of the plate 138 shown in FIGURE 5 than when the plate 138 is in the position shown in FIGURE 3. A tension spring 161 may be provided to urge the lever 120 in the counterclockwise direction as viewed in FIGURES 3 and 5.

Operation of the several moving elements of the described slide changer will first be explained, and then the operation of the slide changer as a whole will be explained. References are made to FIGURES 1, 2, 4 and 5. The teeth 158 are in position to mesh with the teeth 39 of the straight magazine 38. The opposite pusher rods 53 and 54 which comprise the pusher 52 straddles the magazine 38. The slide holder 48 is in its uppermost or slide projecting position. The holder 64 is in its lowest position whereby any slide therein is in the gate position 32. If the light 10 is on and if the mirror 24 is in its non-reflecting position, a slide that is in holder 64 will be projected on the screen 27.

Due to the action of the tension spring 104, both rollers 100 and 100′ are urged into contact with the cam 102. As cam 102 rotates through a portion of its travel the upper roller 100 is raised, bringing the holder 48 to the position shown in FIGURE 2 from the position shown in dotted lines in FIGURE 2, thereby causing the end of the rod 80 which has the hole 88 therein to be raised due to the parallelogram action of the rods 80 and 82. Due to the action of the spring 104, the holder 64 is held down while the bar 62′ comprising the lower edge of the holder 64 contacts the stop 106′, at which time the roller 100′ no longer contacts the cam 102 and the spring 104 is sufficiently stretched to keep the holder 64 against its stop 106′. The stop 106′ is so adjusted that the holder 64 is properly positioned in a vertical direction in the gate position 32 for projection of any slide that may be in the holder 64. Upon rotation of the cam 109, the pusher 52 pushes a slide that is in a compartment of the magazine 38 that registers with the holder 48 into the holder 48, the holder 48 having been moved to the slide exchange position. However, the pusher 52 and guide portions 95 and 97′ are designed to push the slide too far to the right into the holder 48 or 64 that happens to be in registry with the magazine 38. The rods 94 and 94′ are so designed that the end of the rod 94′ pushes the slide that is in the holder 64 to the left as viewed in FIGURE 2 to properly position the slide laterally in a horizontal direction when the holder 64 is in gate position 32 and the end of the rod 94 pushes the slide in the holder 48 laterally when the holder 48 is in gate position 20. The pusher 52 and a slide holder 48 or 64 are arranged so that either the pusher 52 or the holder 48 or 64 that happens to be in slide exchange position can move without interference with the other provided that the pusher 52 and the slide holder 48 or 64 that is in slide exchange position do not move at the same time. Therefore, the holder 48 moves between its upper position, where a slide therein is in the upper gate 20, and at which time the mirror 24 (FIGURE 1) is moved to its position to cause projection of the slide in the holder 48, and its lower position where the holder 48 is in slide exchange position with respect to the magazine 38. The holder 64 moves between the upper slide exchange position and lower slide projection position, and the holders 48 and 64 move in such a manner as not to interfere with each other.

As has been mentioned above, the magazine 38 moves two steps forward to present a slide holding compartment to the pusher 52 for feeding slides into a holder 48 or 64, and the magazine 38 moves one step backwards to present an empty compartment to the pusher 52 in removing slides from a holder 48 or 64. When the cam 134 (FIGURE 2) is in the position shown, the teeth 158 will mesh with the teeth 39 of the magazine 38, and upon rotation of the face cam 166, the lever 120 will be rocked through an angle great enough to advance, to the right as viewed in FIGURE 5, the magazine two steps. As the face cam 166 continues to rotate, the spring 161 pulls the lever 120 back. As soon as the magazine has been moved back one step, the cam 134 rocks the lever 120 about the pivot 126, disengaging the teeth 158 from the teeth 39, and the lever 120 for the rest of this latter motion does not move the magazine 38. Then, the cam 134 permits the lever 120 to rotate towards the magazine 38 and the teeth 158 mesh with the teeth 39. Therefore, the rotation of the lever 120 about its axis 124 and also about its axis 126 causes the magazine 38 to advance two steps and to go back one step alternately.

When it is desired to use a drum type of magazine 117 (FIGURE 3), the plate 138 is grasped by the hand and pulled towards the left as viewed in FIGURE 2 and is rotated 180° and then released. The teeth 154 are now in position to mesh with the teeth 118 of the magazine 117. Also the end of the rod 160 is fixed to the lever 120 at a point near to the cylindircal portion 122, whereby rotation of the face cam 166 now causes a greater amplitude of rocking of the lever 120. This exchange of teeth 158 for teeth 154 and shortening of the distance between the point of application of the force to the lever 120 is necessitated by the fact that the distance between compartments as measured along the periphery of a drum magazine 117 is greater than the distance between compartments of a straight magazine 38, whereby the teeth of the magazine 117 must be moved a greater distance than the teeth of the magazine 38 to cause motion of the magazine 117 equal to the distance between adjacent compartments thereof.

As will be more fully described below, a power means 180 having a start button 182 and including automatic stop means drives the several cams 102, 110, 134 and 166 and moves the mirror 24 in timed relation. The operation of the complete slide changer is described in connection with FIGURE 6 as follows:

See FIGURE 6A: There is no slide in either holder 48 or 64. The holder 48 is in the upper gate position 20. The holder 64 is in the lower gate position 32. The magazine 38 is placed so that its first compartment is in registry with the tooth of the group of teeth 158 that is just behind the center tooth of that group and the pusher 52 is just ahead of the first compartment of the magazine 38. The slides 40 are in the first, second, third, fourth, fifth and etc. compartments of the magazine 38 in the order in which they are to be shown. Cross-sectioning of a slide compartment or a holder 48 or 64 in FIGURE 6 indicates that there is a slide therein. The pusher bars 53 and 54 which comprise the pusher 52 straddle the magazine 38. If the lamp 10 (FIGURE 1) is on, the screen 27 will be illuminated but no slide will be shown thereon. The mirror 24 is in the position where the slide (if any) in the lower gate position 32 is being shown on the screen 27 as indicated by the position of the circle 185.

See FIGURE 6B: The 182 button is pressed which causes the mirror 24 to change positions to the position where it selects the light from the upper gate position 20, as indicated by the position of the circle 185. Also, the magazine 38 goes back one step. The pusher 52 moves to where it will straddle the loading position of the slide holder 48 or 64. The slide holder 64 moves up until it is in the slide exchange position with respect to the magazine 38.

See FIGURE 6C: The pusher 52 goes back to its position straddling the magazine 38. The magazine 38 moves two steps forward (up as viewed in FIGURE 4) whereby its first compartment is in registry with the pusher 52.

See FIGURE 6D: The pusher 52 pushes a slide from the first compartment of the magazine 38 into the holder 64.

See FIGURE 6E: The holder 64 moves down into the lower gate position 32 and the pusher 52 moves back to where it straddles the magazine 38 and the machine stops here. No slide is being shown since there is no slide in the holder 48 which is in the gate position 20. This operation so far may be considered to be the first half of a preparatory or unload operation to unload any slide that may inadvertantly have been left in the holder 64 and to load the first slide of magazine 38 into holder 64.

See FIGURE 6F: The button 182 is pressed again. The mirror 24 moves so that the light from the lower gate position 32 is selected. The magazine 38 moves back one step. The pusher 52 goes to where it straddles the loading positions of the holders 48 or 64. The holder 48 goes to the slide exchange position. The slide in the lower gate position is shown.

See FIGURE 6G: The pusher 52 goes back to where it straddles the magazine 38 unloading any slide that may have been left in the holder 48. (This completes the preparatory or unloading operation.) The magazine 38 is moved two steps forward.

See FIGURE 6H: The pusher 52 pushes a slide from the second compartment of the magazine 38 into the holder 48.

See FIGURE 6I: The holder 48 moves up into the top gate position 20. The pusher 52 goes back to where it straddles the magazine 38 and the machine stops.

See FIGURE 6J: The button is pressed again. The mirror 24 goes to the position where the light from the upper gate position 20 is selected. The magazine 38 moves one step back. The pusher 52 goes through the first empty compartment of the magazine 38 to where it straddles the holder loading position and the holder 64 moves up to the holder loading position.

See FIGURE 6K: The pusher 52 moves the slide from the holder 64 into the first compartment of the magazine 38.

See FIGURE 6L: The magazine 38 moves two steps forward. Then the pusher 52 pushes the slide out of the third compartment of the magazine 38 into the holder 64.

See FIGURE 6M: The holder 64 moves down to the lower gate position 32, the pusher 52 goes back to where it straddles the magazine 38 and the machine stops.

From then on the described operation repeats. That is, each time the button 182 is pressed, the position of the mirror 24 is changed to show a slide in the other of the two gate positions 20 and 32 and also a slide is put back into the compartment of the magazine 38 from which it was taken and another slide is moved into a holder 48 or 64. The pusher 52 moves back to where it straddles the magazine and the machine stops.

Modifications of the above-described apparatus may occur to a person skilled in the art. For example, the table 42 and the magazine 38 or 117 may be positioned to the right or to the left of the two light paths. The table 42 may be provided with an insert to fit and hold the drumlike magazine 117. Therefore, the above description is to be considered as illustrative and not in a limiting sense.

What is claimed is:

1. In a slide projector including means for projecting light along two paths positioned one above the other, means for supporting a slide magazine on one side of and at an elevation between the elevations of said two light paths, a first and a second slide holder mounted for motion between two positions, the first position of said first holder being in the upper path and the second position of the first holder being in slide exchange position with respect to a slide magazine which is supported on said magazine supporting means, the first position of said second slide holder being in said lower path and the second position of said second slide holder being in said slide exchange position.

means to move slides back and forth between said magazine and the slide holder that is in slide exchange position, means to move said magazine two steps forward and one step backward alternately to present full compartments of said magazine to said slide holders when they have no slides therein and to present empty compartments to said slide holders when the slide holders have slides therein, said mounting for each of said slide holders comprising two parallel arms, each arm being pivoted on said slide holder and each arm also being pivoted on a support for providing parallelogram motion of said arms, whereby the orientation of said holder is not changed as said arms rotate about their pivots, and cam means positioned between the arms which are attached to different holders for causing rotation of said arms about their pivots whereby said slide holders are moved between slide exchange and light path positions.

2. The invention as expressed in claim 1 in which respective stops are provided for limiting motion of said slide holders away from said slide exchange position and in which a spring is attached to the ends of the arms pivoted on respective slide holders beyond the point of pivoting of said arms on said support whereby one arm that is pivoted on a slide holder is positively moved by said cam and one arm that is pivoted on another slide holder is held in its light path and against a respective one of said stops by said spring.

3. The invention as expressed in claim 1 in which slide pusher bars are fixed to arms which are themselves fixed to respective slide holder arms, said slide pusher bars being so mounted as to push a slide in the associated slide holder into the light path in which the associated slide holder is positioned for correction of the position of such slide in a light path.

4. In a slide projector including means for projecting light along two paths positioned one above the other, means for supporting a compartmented slide magazine on one side of and at an elevation between the elevations of said two light paths, a first and a second slide holder mounted for motion between two positions, the first position of said first holder being in the upper path and the second position of the first holder being in slide exchange position with respect to a slide magazine which is supported on said magazine supporting means, the first position of said second slide holder being in said lower path and the second position of said slide holder being in said slide exchange position, means to move slides back and forth between said magazine and the slide holder that is in slide exchange position, and means to move said magazine two steps forward and one step backward alternately to present full compartments of said magazine to said slide holders when they have no slides therein and to present empty compartments to said slide holders when the slide holders have slides therein, said means to move said magazine comprising a lever mounted to be rocked about one axis and also mounted to be rocked about a second axis at right angles to said one axis, there being teeth for meshing with teeth on a slide magazine at an end of said lever.

means for urging rotation of said lever about one of said axes in a direction to cause meshing of said teeth on said lever with teeth on a magazine, means for rocking said lever about the second of said axes through a distance necessary to move said magazine the distance between three compartments, and means to rotate said lever about said one axis in a direction to unmesh said teeth during rocking of said lever in one of its two directions of motion about said second axis.

5. The invention as expressed in claim 4 in which said teeth are mounted on a plate which is rotatable with respect to said lever and in which other teeth adapted to mesh with teeth on a magazine of a different shape are also mounted on said plate, whereby either group of teeth may be rotated with respect to said lever to magazine moving position.

6. The invention as expressed in claim 4 in which said teeth are mounted on a plate which is rotatable with respect to said lever and in which other teeth adapted to mesh with teeth on a magazine of a different shape are also mounted on said plate, whereby either group of teeth may be rotated with respect to said lever to magazine moving position, and in which means are provided to change the angle of rocking of said lever about its second axis upon a change in the group of teeth on said plate rotated to magazine moving position.

7. In a slide projector including means for projecting light along two paths positioned one above the other.

means for supporting a slide magazine on one side of and at an elevation between the elevations of said two light paths, a first and a second slide holder mounted for motion between two positions, the first position of said first holder being in the upper path and the second position of the first holder being in slide exchange position with respect to a slide magazine which is supported on said magazine supporting means, the first position of said second slide holder being in said lower path and the second position of said second slide holder being in said slide exchange position, means to move slides back and forth between said magazine and the slide holder that is in slide exchange position, means to move said magazine two steps forward and one step backward alternately to present full compartments of said magazine to said holders when they have no slides therein and to present empty compartments to said slide holders when the slide holders have slides therein, and a single cam, spring load assembly for imparting said motion to said slide holders, means for timing said cam means, said slide moving means and said magazine moving means to move said slides from said magazine in the order in which they appear in said magazine alternately into said light paths with each of said slides being returned to its original position in said magazine.

References Cited

UNITED STATES PATENTS 1,400,958   12/1921   Kelly _____ 353—82
1,738,942   12/1929   Brenkert et al. _____ 353—82

NORTON ANSHER, Primary Examiner

ROBERT P. GREINER, Assistant Examiner

U.S. Cl. X.R.

353—103